United States Patent Office 3,446,258
Patented May 27, 1969

3,446,258
CANE HARVESTER
Alexandr Konstantinovich Vyaznikov, ul. Kirova, 39, kv. 43; Vasily Pavlovich Egorov, pos. Kalinina, 94, kv. 6; Nikolai Nikitovich Melnikov, Krasnogorskaya ul., 22, korp. 6, kv. 10; Boris Andreevich Popov, Oktyabrsky pr., 143, kv. 3; and Evgeny Ilich Khokhlov, 1 Zavodskoi dvor, 11, kv. 32, all of Ljubertsy Moskovskoi Oblasti, U.S.S.R.
Filed Mar. 1, 1967, Ser. No. 619,788
Int. Cl. A01d *55/02;* B02c *13/00;* A01f *11/00*
U.S. Cl. 146—108                                     3 Claims

ABSTRACT OF THE DISCLOSURE

A harvester for cane including a stem chopper and a conveyor disposed under the chopper for carrying the chopped mass. A board is positioned between the conveyor and chopper for taking stem tops aside from the conveyor and the board is capable of movement along the chopper.

---

The present invention relates to devices for separating and removing the tops of cane stems in cane harvesters.

Known in the art are cane harvesters with devices for separating and removing the tops of cane stems, said devices being provided with a topping knife which is rather a complex unit comprising, in addition to the knife proper, conveyors for gathering stem tops and removing them from the cane harvester.

The topping knife is provided either in front of the cane harvester or behind a conveyor designed to separate the cut stems (see the U.S. Patent No. 2,953,886).

A disadvantage of the known devices with a front topping knife lies in the fact that during the cutting process it is necessary to guide a cutterbar along the lower portion of the harvested row simultaneously guiding the topping knife towards the tops of the stems in the same row. As most of the stems are not vertical but bend irregularly, not all of them get on the topping knife with their tops, the impeding fact the control of the cane harvester and leading to distortion of the operation cycle and dockage of the crop. When the topping knife is provided behind the conveyor which separates the cut stems, the tops of the stems are held somewhat back during the topping process and, as a result, said stems enter the chopper being inclined relative to its axis.

An object of the present invention is to eliminate said disadvantage by providing the cane harvester with a device for separating and removing the stem tops, said device being simple in design and convenient in operation.

This object is achieved by means of a fender to move the cane tops away from the conveyor, said fender being arranged in the cane harvester between the conveyor and the chopper, with the conveyor placed under the chopper.

The fender can be made movable along the chopper.

It is reasonable to provide a slit in said fender so that the commercial portion of the chopped stems could pass onto the conveyor, if some of the stems get on the fender.

An embodiment of the invention to be described by way of example is shown in the drawings, wherein.

Figure 1:
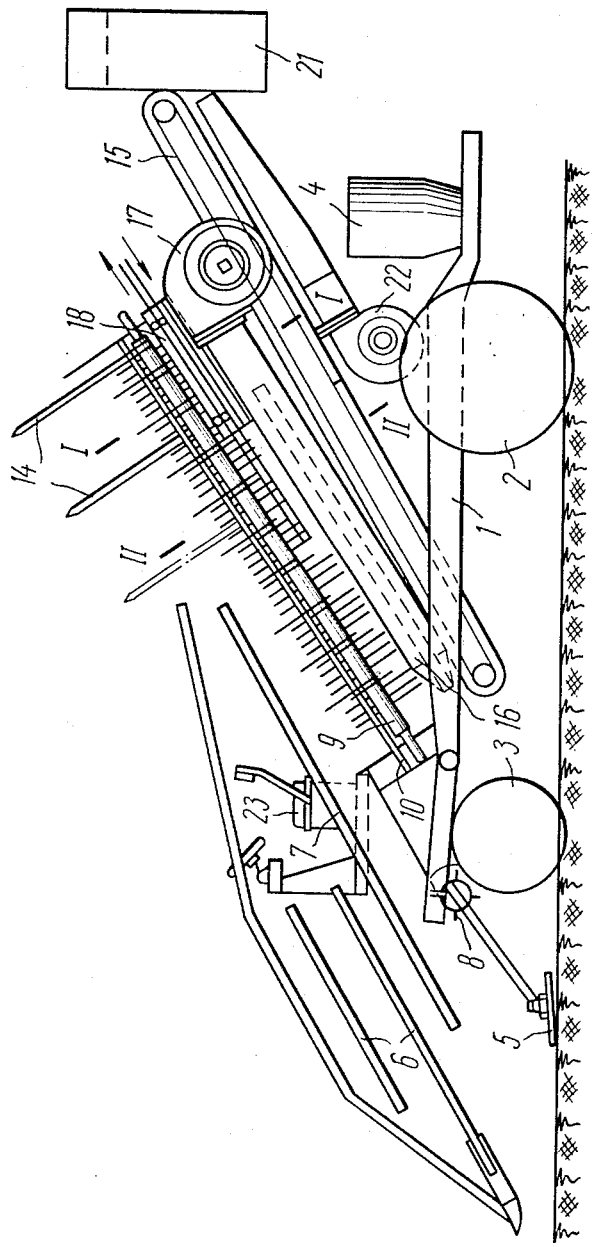
FIGURE 1 is a diagram of the cane harvester, according to the invention (side views)

The cane harvester is a self-propelled unit comprising a frame 1 (FIGURE 1) with driving wheels 2 and driven wheels 3, said frame carrying on its rear portion an engine 4 and all the necessary working elements. Secured in front of the cane harvester is a cutterbar 5 above and ahead of which are two pairs of endless chains 6 with pins.

Figure 2:
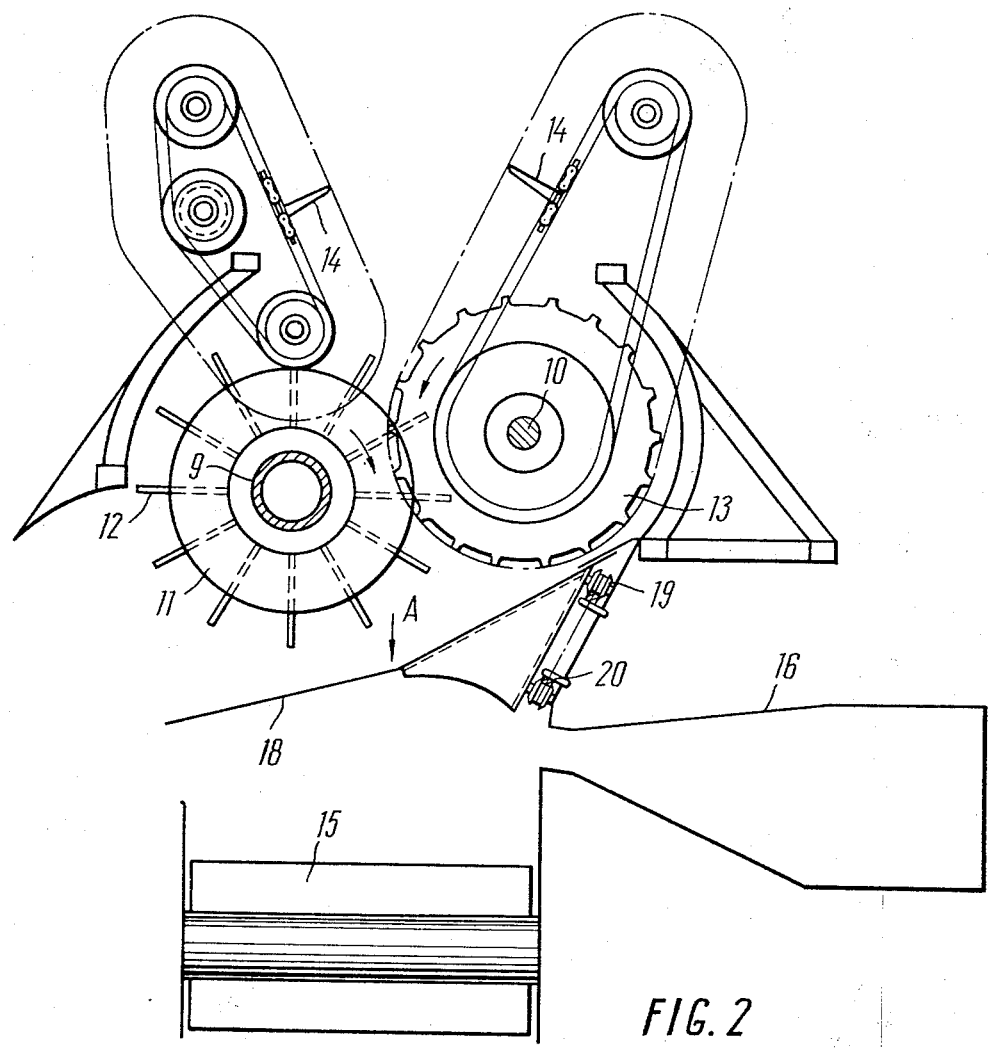
FIGURE 2 is a sectional view along line I—I of FIGURE 1.

Somewhat farther and behind the cutterbar 5 is mounted a conveyor 7 which separates the cut stems. Under said conveyor and behind the cutterbar 5 is a clod separator 8 which is made as a rotating drum with pins to clean the lower portion of the stems. A chopper made of parallel shafts 9 and 10 (FIGURE 2), rotating towards each other, is provided behind and under the conveyor 7, being inclined lengthwise the cane harvester.

Knife disks 11 are installed at a certain distance on the shaft 9, with flexible pins 12 being secured between said knife disks.

On the shaft 10 are secured pocket disks 13, said disks being opposite to the knife disks 11.

To gather the stems into the chopper there are several pin-type chain conveyors 14 installed over said chopper.

A gathering conveyor 15 with a collecting part arranged under the chopper is provided in the cane harvester to gather and convey the chopped stems. On the left side and above said conveyor is nozzle 16 of an air blower 17 (FIGURE 1). Installed under the nozzle 16 between the chopper and the gathering conveyor 15 is a fender 18, said fender can be moved by rollers 19 (FIGURE 2) on guides 20 along the chopper.

Figure 3:
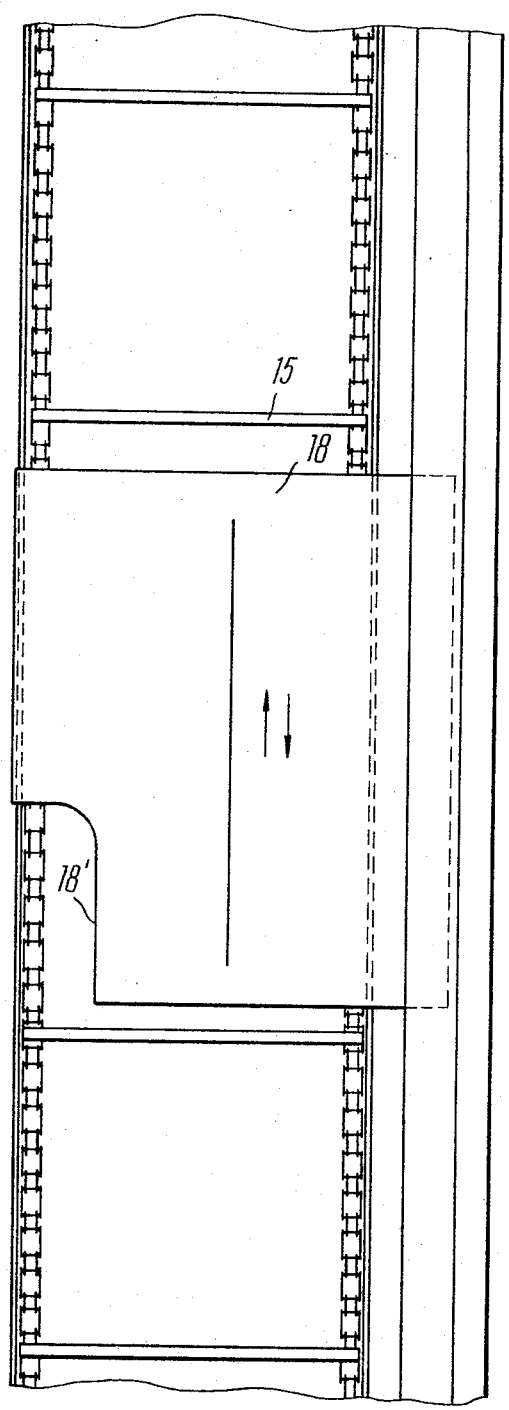
FIGURE 3 is a view along arrow A of FIGURE 2.

The front side of the fender 18 has a shear 18$^1$ (FIGURE 3) which makes the front side smaller than the rear one. As a result, said front side does not overlap the gathering conveyor completely, and this permits additional separation of the chopped stems and tops. Fed onto the front side of the fender 18 is the mass which may contain pieces of the chopped tops due to a diverse height of the stems. Under the action of the flexible pins 12 this mass slides along the fender 18 toward its edge.

When falling from the fender 18 pieces of the chopped tops are drawn in by the air blower, while pieces of the commercial portions of the stems, being heavier and having a higher falling speed, are fed onto the gathering conveyor.

Behind the gathering conveyor and across the cane harvester is a discharge conveyor 21 (FIGURE 1), and under the gathering conveyor 15 is a blower 22 designed to separate the remaining leaves when the harvested crop falls from the gathering conveyor onto the discharge one.

Control of the cane harvester is effected from a working stand.

With the cane harvester in operation, cane stems are gathered by the chains 6 and conveyor 7. With the stems being carried by said conveyor, their lower portions are cleaned by the clod separator 8, and their tops are simultaneously bent back in the direction of the machine movement. Having been discharged by the conveyor 7, the stems fall down to be fed into the chopper by the pin type chain conveyors 14, where they are picked up by the pocket disks 12 mounted on the shaft 9. As the rotation speed of the shaft 9 is higher than that of the shaft 10, the ends of the flexible pins come ahead of the stems fed by the pocket disks 19. The latter slowly bring the stems up to the flexible pins 12 of the high-speed rotation shaft 9. Said pins clear the stems off the leaves, while the knife disks 11, cooperating with the pocket disks 13, cut them into pieces.

The pins 12 are capable of cleaning the leaves only from the commercial portions of the stem as there the bond between the leaves and the stem is weaker than that on the top portions of the stems. The moving chopped mass is blown through by the air blower 17 with the help of a nozzle 16; the result of it is separation of the mass into free leaves, which are disposed from the machine, and commercial pieces that fall onto the gathering conveyor 15. Pieces of the chopped tops fall onto the fender 18 and under the action of flexible pins 12 are carried along said fender toward its edge to be removed. The disposed tops are drawn in by the air blower nozzle 16 and discharged from the machine.

Falling onto the front side of the fender is the mass which contains both the stem pieces and the chopped tops. This is owing to the varying height of the cane stems and, consequently, the varying length of the commercial portions of the stems fed into the chopper at a time.

The shear $18^1$ fails to overlap the collector of the gathering conveyor. That is why commercial pieces of stems, as the heavier ones and having a higher hovering speed, cannot be drawn in by the air flow and fall onto the gathering conveyor. As for the chopped tops, they are discharged from the machine by the air flow.

The gathering conveyor 15 discharges the commercial pieces of the stems onto the discharge conveyor 21. When said pieces are falling onto the conveyor they are additionally cleaned by the air of the blower 22.

The discharge conveyor 21 feeds the cane crop into hauling means.

Although the present invention has been described with reference to the preferred embodiment thereof, various modifications and alterations can be made without departing from the idea and scope of the invention which those skilled in the art will easily understood.

Those modifications and alterations are considered as not departing from the idea and scope of the invention and the attached claims.

We claim:
1. A cane harvester, comprising: a stem chopper; a conveyor for carrying the chopped mass, said conveyor being disposed under said stem chopper; a board for taking stem tops aside from said conveyor, said board being disposed between said conveyor and said stem chopper.
2. A cane harvester as set forth in claim 1 wherein said board is made with the possibility of being moved along said stem chopper.
3. A cane harvester as set forth in claim 1, wherein said board is fitted with a shear for passage of necessary part of chopped stems over to said conveyor if said stems get to said board.

References Cited

UNITED STATES PATENTS 2,621,461  12/1952  Tiedtke _____ 56—16 X
3,325,982  6/1967  Fogels et al. _____ 56—16 X JAMES M. MEISTER, *Primary Examiner.*

U.S. Cl. X.R.
56—16; 146—107